June 6, 1933.  O. M. SUMMERS  1,913,175
METHOD OF MAKING REFRIGERATING APPARATUS
Original Filed April 4, 1930   3 Sheets-Sheet 1
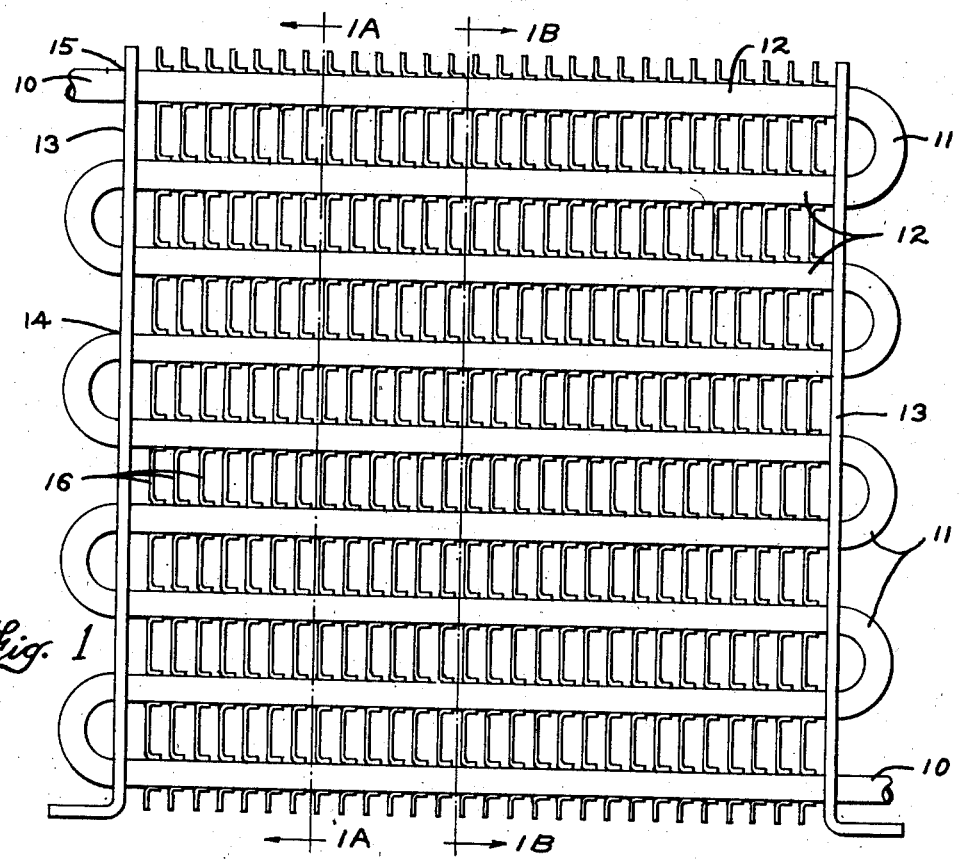
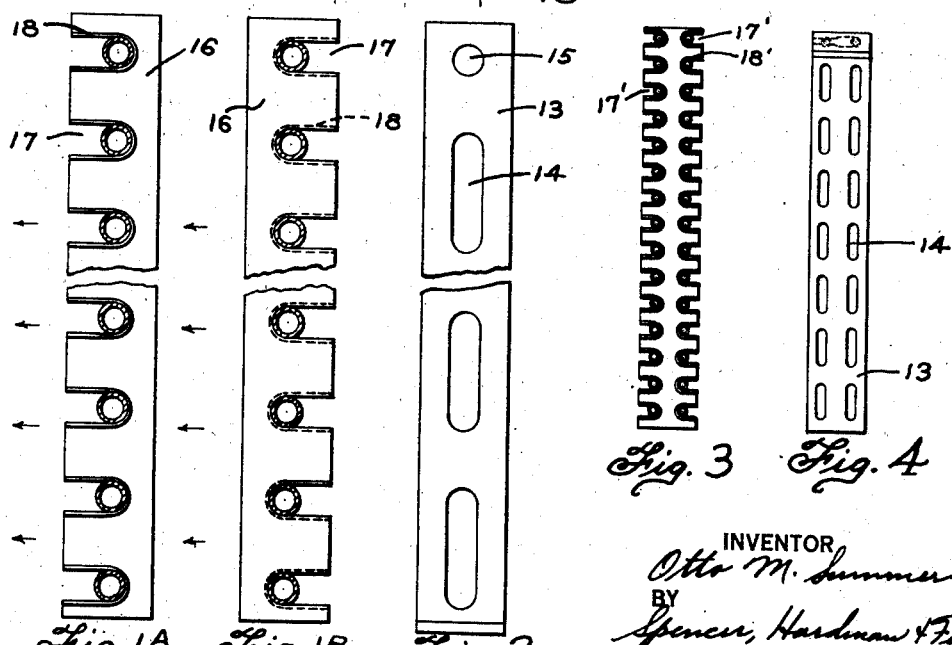
INVENTOR
Otto M. Summers
BY
Spencer, Hardman & Felor
ATTORNEY

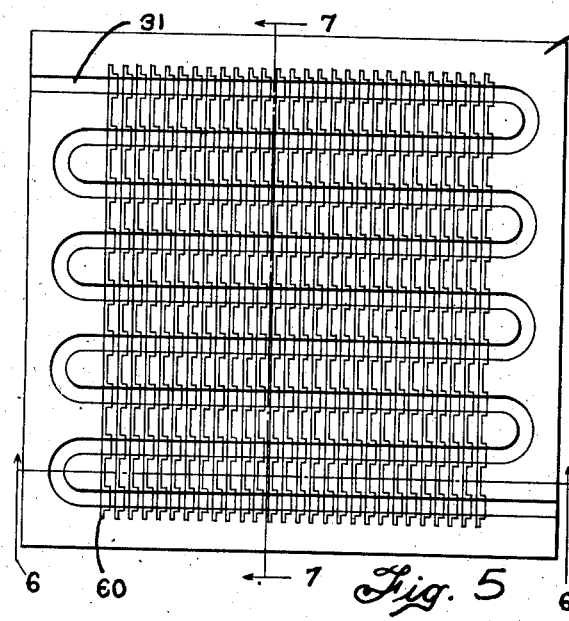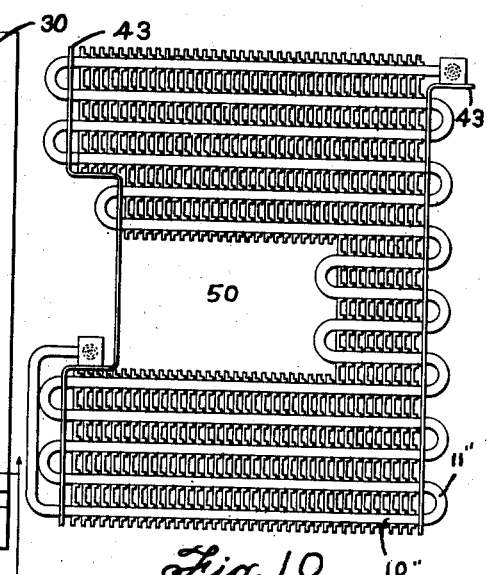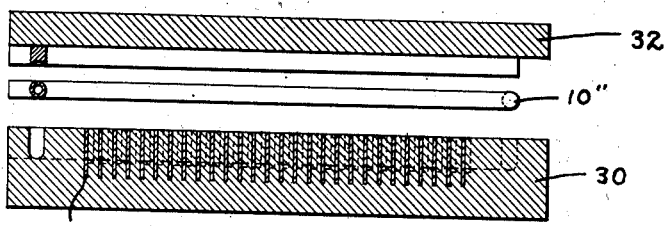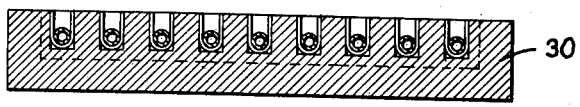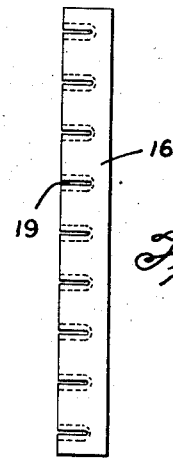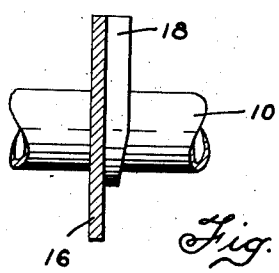

June 6, 1933.  O. M. SUMMERS  1,913,175
METHOD OF MAKING REFRIGERATING APPARATUS
Original Filed April 4, 1930  3 Sheets-Sheet 3

INVENTOR
Otto M. Summers
BY
Spencer, Hardman & Fehr
ATTORNEY

Patented June 6, 1933

1,913,175

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

METHOD OF MAKING REFRIGERATING APPARATUS

Original application filed April 4, 1930, Serial No. 441,463. Divided and this application filed November 29, 1930. Serial No. 499,052.

This invention relates to refrigerating apparatus, and more particularly to a method of manufacturing a heat exchange element for use in refrigerating apparatus. This application is a division of application No. 441,-463, filed April 4, 1930.

For one of its objects this invention contemplates a heat exchange element comprising a looped coil provided with spaced fins mounted thereon. More particularly, it is an object of this invention to provide a continuous metal tube bent to form a heat exchange element having a plurality of reverse bends and a plurality of straight portions, the straight portions being provided with a plurality of parallel notched strip fins mounted thereon, and the notches being provided with flanges along the edges thereof.

A further object of this invention is to provide a method of manufacturing a heat exchange element of the above type, and more particularly a method of attaching fins to such a heat exchange element.

Further objects and advantages of the present invention will be apparent from the following description, reference being had to the accompanying drawings wherein a preferred embodiment of one form of the present invention is clearly shown.

In the drawings:

Fig. 1 is a view in elevation of one form of completed condenser;

Fig. 1a is a view in section taken on the line 1A—1A of Fig. 1;

Fig. 1B is a view in section taken on the line 1B—1B of Fig. 1;

Fig 2 is a view in elevation of the end member shown in Fig. 1;

Fig. 3 is a view in section of a double pipe condenser taken on a line corresponding to the line 1A—1A of Fig. 1;

Fig. 4 is a view in elevation of an end member used in a double pipe condenser;

Fig. 5 is a view in elevation of apparatus used in constructing the condenser;

Fig. 6 is a view in section taken on the line 6—6 of Fig. 5 and showing additional apparatus for performing a step in the process;

Fig. 7 is a view in section on the line 7—7 of Fig. 6 showing the coil located within the notches of the fins;

Fig. 8 is a detailed view of part of the finished condenser;

Fig. 9 is a view in elevation of one of the uncompleted strip fins;

Fig. 10 is a view in elevation of a completed modified form of condenser;

Figure 11:
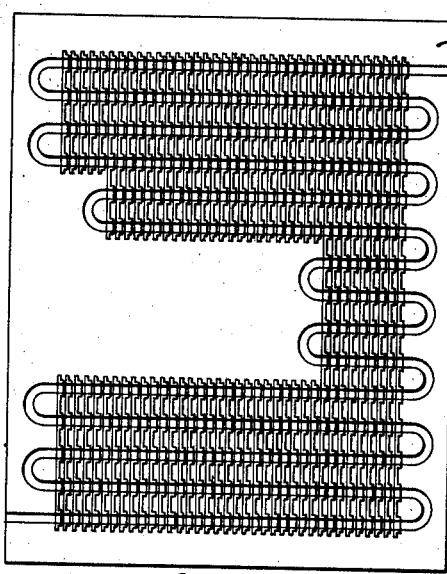
Fig. 11 is a view in elevation of apparatus for performing a step in the process of assembling the condenser shown in Fig. 10.
Figure 15:
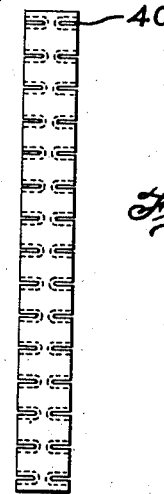
Figure 12:
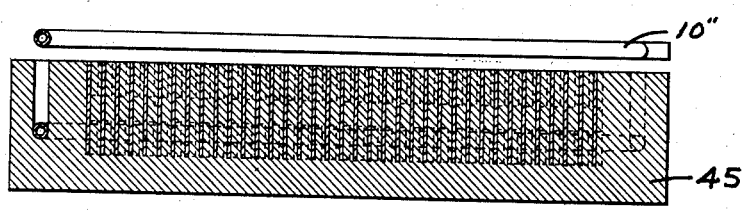
Figure 13:
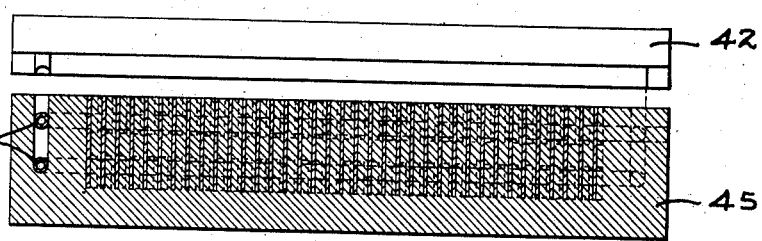
Figure 14:
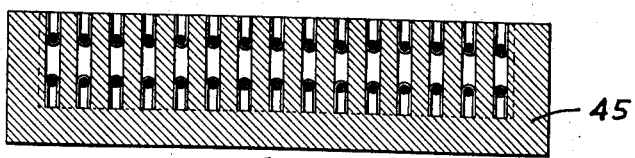

Figs. 12, 13, and 14 are sectional views of apparatus used in constructing the condenser and showing the condenser at different points of its manufacture;

Fig. 15 is a view in elevation of an uncompleted strip fin used in the modified form of apparatus.

For purposes of illustration, a heat exchange element such as contemplated by this invention may be a refrigerating condenser, various forms of which have been illustrated on the drawings and are hereafter fully described. Obviously, however, a refrigerating condenser is but one of the many elements to which this invention has reference.

In Figs. 1 to 4, I have disclosed a so-called single pipe condenser which may comprise the tubing 10 bent into the form of a serpentine coil provided with a plurality of looped ends 11 and a plurality of straight portions 12. The condenser may be supported in assembled form by means of the end pieces 13, shown more clearly in Fig. 2 as being provided with the elongated openings 14 for the reception of the bent portions of the tube 10, and with the circular opening 15 for the reception of a straight portion of the tube. Between the end members 13 there is provided a plurality of fins which may take the form of metal strip fins 16. The fins 16 are provided with a plurality of spaced notches 17 extending inwardly from the lateral edge of the fin. Along the outer edges of the notches the fins are bent at substantially 90° to provide flanges 18 against which the straight portions of the tubing 12 are adapted to bear. As shown in the drawings, these flanges extend along the side edges of the notches and around the semi-circular edge of the inner extremity of the notches. The flanges along the side edges of the notches are all substantially parallel and serve as guides or baffles for the air currents passing thereover. In actual operation, a fan is provided for drawing or forcing air over the condenser. In the construction shown, the fan would be located either in front of or in back of the condenser and would draw or force the air through the condenser as indicated by the arrows shown in Figure 1A. In this manner, the flanges 18 serve as baffles and prevent the formation of eddy currents on the far side of the coil, after the air has passed thereover. The baffles 18 would also serve as baffles in the same manner with the air traveling in the opposite direction.

In Fig. 1, a single pipe condenser has been shown that is, a condenser formed of a single continuous tube 10 bent into the form shown, but obviously a double pipe condenser could be constructed in the same manner. For example, Figs. 3 and 4 disclose a double pipe condenser in section, showing the fins provided with the notches 17' extending inwardly from both edges thereof. In this type of construction, the end member 13' is provided with two sets of elongated openings 14' for the reception of the two sets of reverse bends.

The method of and apparatus for assembling or manufacturing the condenser shown in Fig. 1, and more particularly the apparatus for and the method of attaching the fins 16 to the serpentine coil 10 will now be described. In Figs. 5 to 9 inclusive, apparatus for manufacturing or assembling the condenser disclosed in Fig. 1 is shown. The tubing 10 is first bent into the form of a serpentine coil, for example into the form shown in Fig. 1. The fin 16, which may take the form of metal strip fins, are cut out to fit this form of condenser. For example each strip fin 16 is provided with notches 17 extending inwardly from the one edge of the fin and spaced apart a distance equal to the space between the straight portions of the tubing. These notches may be formed by cutting out a piece of metal as indicated at 19 in Fig. 9 and by bending back the fin as indicated for instance, by the dot-and-dash lines in Fig. 9 to form flanges. After the notch has been formed the fins should be assembled in a frame member 30 as shown in Fig. 5 which member is provided with a passage 31 similar to the shape of the condenser to be made. The member 30 is also provided with a plurality of slots 60 for the reception of the strip fins so that the fins may be held in a vertical position with the notches facing upwardly. The frame 30 with the strip fins 16 arranged therein may then be placed in a press and the serpentine coil 10 placed above the fins with the straight portions of the serpentine coil corresponding to the notches in the fins as shown in Fig. 6. The member 32, which is intended to indicate a part of the press or other apparatus used for forcing the tube into the fins, is then brought to bear upon the serpentine coil 10. The coil is thus forced into the notches in the strip fins by lateral movement of the coil. After this operation, the tubing 10, with the fins 16 attached thereto by friction, may be withdrawn from the frame member 30 and may be provided with the end members 13 by slipping the latter over the bent edges of the tube. The condenser may then be dip-soldered, if desired, to securely attach the fins and the end members to the tube.

In Figs. 10 through 15 inclusive, I have disclosed the method of and apparatus for assembling a modified form of condenser. This condenser is of the double pipe type and differs from that described in Fig. 1 only in the specific design thereof; that is, some of the straight portions of the condenser are considerably shorter than others to provide a central space 50. The purpose of such a design is to provide for a more convenient arrangement in connection with a refrigerating compressor and the motor for driving the compressor, whereby the condenser may be located between the motor and compressor and the motor shaft may pass through the space 50. The method of manufacturing or assembling this type of condenser is essentially the same as that described for the single pipe condenser. The strip fins are first provided with the notches extending inwardly from both edges of the fin by cutting out the portions 40 as indicated in Fig. 15 and bending back the metal surrounding the slot 40 on the dotted lines. After the notches have been formed, the fins are assembled in the frame member 41 which is similar to the frame member 30, the fins being held in a vertical position in the frame with one set of notches extending upwardly. The tubing 10″, which has previously been bent into the desired form, is then placed above the fins with the straight portions corresponding to the notches therein. The tubing 10″ is then forced downwardly into the notches by means of the press member 42. After one tube has been forced into the fins from one edge thereof, the fins and the tube are withdrawn from the frame member 41 and placed in a second frame 45 similar to the frame 41, but constructed to accommodate the partly completed condenser as shown in Fig. 12. The second tubing 10″ is then forced into the second set of notches, and after removal the end members 43 corresponding to the end members 13 of Fig. 1 may then be placed on the condenser by lateral movement of the end member over the bent edges of the tube. The whole unit may then be dip-soldered to provide complete contact between the metal fins and the serpentine coil.

In all modifications, the fins are first provided with the notches extending from a lateral edge of the fin, so that the condenser may be assembled by what I term the side entry of the serpentine into the notched fins. It should be noted that the amount of metal removed from the strip fins is relatively small and advantage is taken of practically all of the fin for the dissipation of heat. In addition the surface contact between the tubing and the fins is relatively large due to the semi-circular flange engaging the surface of the tube, which contact is further increased by dip-soldering the whole assembly.

While I have described the notches as formed by cutting or punching out the small slots as shown at 40 and 19, it is obvious that other ways of forming the notches may be employed. For example the notches may be formed by the step by step process, that is by first cutting out a semi-circular opening slightly smaller than the diameter of tubing and thereafter slitting the tubing from the opening to one edge of the fin and binding back the edges of the slit to form a slot, at the same time bending back the edge of the semi-circular opening to provide the semi-circular flange contacting the serpentine coil. Or, if so desired, the fins may be provided with a narrow slit by cutting out a portion similar to the portion 19 or 40, and the coil may be forced inwardly through this slit, thereby forming the lateral flanges by the coil itself.

While the form of embodiment of the invention as herein disclosed, constitutes a preferred form, it is to be understood that other forms might be adopted, all coming within the scope of the claims which follow.

What is claimed is as follows:

1. The method of manufacturing a heat exchange element which comprises forming a tube into a serpentine coil having a plurality of straight portions, slitting a plurality of metal strip fins at a plurality of spaced points corresponding to the straight portions of the tube, supporting said fins against lateral displacement and forcing the straight portions of the tube laterally into the slots so formed and soldering the strip fin to the straight portions of the tube.

2. The method of manufacturing a heat exchange element which comprises forming a tube into a serpentine coil having a plurality of straight spaced portions, providing a plurality of metal strip fins with a plurality of notches having flanges extending along the edges thereof at a plurality of spaced points corresponding to the straight portions of the tube, supporting said fins against lateral displacement and forcing the straight portions of the tube into the notches so formed substantially as described.

3. The method of manufacturing a heat exchange element which comprises forming a tube into a serpentine coil having a plurality of straight portions, slitting a metal fin at a plurality of spaced points corresponding to the straight portions of the tube, bending back the edges of the slit substantially at right angles to the fin to form notches having edge flanges, and forcing the straight portions of the tube in the notches so formed by lateral movement of the tube substantially as described.

4. The method of attaching fins to a conduit which comprises slitting the fins from one edge thereof, bending back the edges of the slit to form a slot, supporting the fins against lateral movement and forcing the conduit into the slot so formed substantially as described.

5. The method of attaching fins to a conduit which comprises slitting the fins from one edge thereof, bending back the edges of the slit to form a slot, supporting the fins against lateral movement and forcing the conduit into the slot so formed, soldering the conduit and fin in this assembled form substantially as described.

6. The method of manufacturing a heat exchange element which comprises forming a tube grid having a plurality of straight portions, slitting a plurality of metal strip fins at a plurality of spaced points corresponding to the straight portions of the tube grid, supporting said fins against lateral displacement and forcing the straight portions of the tube grid laterally into the slots so formed.

7. The method of manufacturing a heat exchange element which comprises forming a tube grid having a plurality of straight portions, slitting a plurality of metal strip fins at a plurality of spaced points corresponding to the straight portions of the tube grid, supporting said fins against lateral displacement and forcing the straight portions of the tube grid laterally and simultaneously into the slots so formed.

8. The method of manufacturing a heat exchange element which comprises forming a tube into a serpentine coil having a plurality of straight portions, slitting a plurality of metal strip fins at a plurality of spaced points corresponding to the straight portions of the tube and forcing the straight portions of the tube laterally and simultaneously into the slots so formed and soldering the strip fins to the straight portions of the tube.

9. The method of manufacturing a heat exchange element which comprises forming a tube into a serpentine coil having a plurality of straight portions, slitting a plurality of metal fins at a plurality of spaced points corresponding to the straight portions of the tube, bending back the edges of the slit substantially at right angles to the fins to form notches having edge flanges, and forcing the straight portions of the tube simultaneously in the notches so formed by lateral movement of the tube substantially as described.

10. The method of manufacturing a heat exchange element which comprises forming a tube grid having a plurality of straight portions, slitting a plurality of metal fins at a plurality of spaced points corresponding to the straight portions of the tube grid, bending back the edges of the slit substantially at right angles to the fins to form notches having edge flanges, and forcing the straight portions of the tube grid in the notches so formed by lateral movement of the tube grid substantially as described.

11. The method of manufacturing a heat exchange element which comprises forming a tube into a serpentine coil having a plurality of straight portions, slitting a metal fin at a plurality of spaced points corresponding to the straight portions of the tube, bending back the edges of the slit substantially at right angles to the fin to form notches having edge flanges supporting said fin against lateral displacement, and forcing the straight portions of the tube in the notches so formed by lateral movement of the tube substantially as described.

12. The method of manufacturing a heat exchange element which comprises forming a tube into a serpentine coil having a plurality of straight portions, slitting a plurality of metal fins at a plurality of spaced points corresponding to the straight portions of the tube, bending back the edges of the slit substantially at right angles to the fins to form notches having edge flanges supporting said fins against lateral displacement, and forcing the straight portions of the tube simultaneously in the notches so formed by lateral movement of the tube substantially as described.

13. The method of manufacturing a heat exchange element which comprises forming a tube grid having a plurality of straight portions, slitting a metal fin at a plurality of spaced points corresponding to the straight portions of the tube grid, bending back the edges of the slit substantially at right angles to the fin to form notches having edge flanges, supporting said fins against lateral displacement and forcing the straight portions of the tube grid in the notches so formed by lateral movement of the tube grid substantially as described.

In testimony whereof I hereto affix my signature.

OTTO M. SUMMERS.